(No Model.)
R. M. HUNTER.
ELECTRICAL TRANSMISSION OF POWER.
No. 581,684. Patented Apr. 27, 1897.
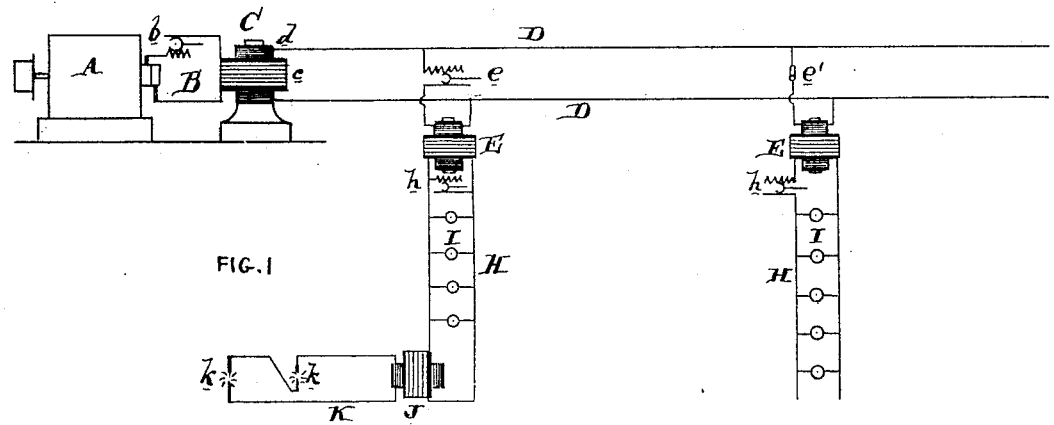
FIG. 1
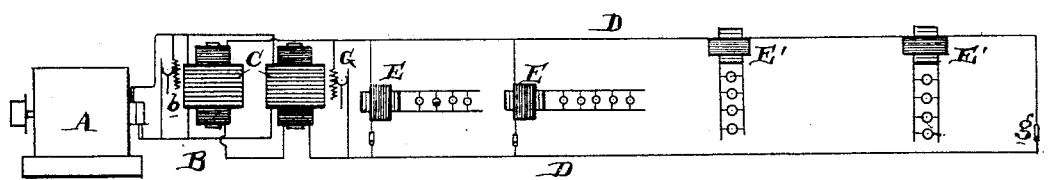
FIG. 2
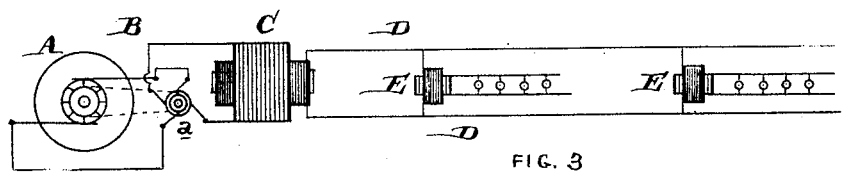
FIG. 3
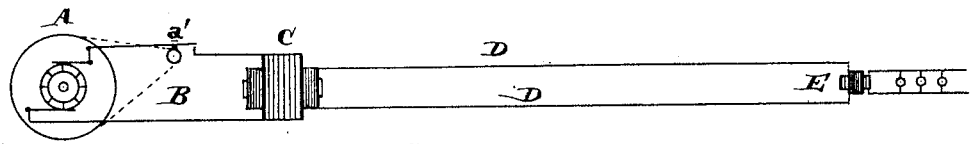
FIG. 4
Attest
S. J. Yerkes.
Maurice H. Holmes.
Inventor
THE NORRIS PETERS CO., PHOTO-LITHO., WASHINGTON, D. C.

UNITED STATES PATENT OFFICE.

RUDOLPH M. HUNTER, OF PHILADELPHIA, PENNSYLVANIA.

ELECTRICAL TRANSMISSION OF POWER.

SPECIFICATION forming part of Letters Patent No. 581,684, dated April 27, 1897.

Original application filed November 9, 1887, Serial No. 254,672. Divided and this application filed August 1, 1890. Serial No. 360,619. (No model.)

*To all whom it may concern:*

Be it known that I, RUDOLPH M. HUNTER, of the city and county of Philadelphia and State of Pennsylvania, have invented an Improvement in Electrical Transmission of Power, of which the following is a specification.

My invention has reference to electrical transmission of power; and it consists of certain improvements, all of which are fully set forth in the following specification and shown in the accompanying drawings, which form a part thereof.

This application (Case No. 158) is a division of my application, Serial No. 254,672, filed November 9, 1887.

The object of my invention is to provide suitable apparatus whereby the conversion of currents by means of induction apparatus may be accomplished in a more satisfactory manner from a practical point of view. Heretofore it has been customary to wind the generating-machine for alternating currents so as to produce currents of high tension or pressure, and such currents were conveyed down the line to the point where they were to be converted by the induction apparatus into currents of low intensity and greater volume for local use. The main object in this system is to reduce the metal in the line conductors to a minimum, and consequently make the expense of construction as small as possible; and, furthermore, this system is more particularly adapted for local divisions which are to be independently controlled without affecting the remaining divisions upon the circuit. There is considerable objection to winding the primary generator for high-tension currents, first, because of its expense, and, second, because of the danger to the insulation.

My object is therefore to employ a generator (of whatever character it may be) wound for low-intensity currents of those giving small potential and great volume and converting such low-potential currents immediately at the generating-station into currents of high potential by means of an induction-coil or secondary generator. The high-potential current so generated may be far higher than it would be safe to attempt to make them by the employment of an alternating-current dynamo, and by so increasing their potential I am enabled to still further reduce the size of the line-wire and the strength of its supports to convey a given amount of electrical energy to a distant point. This is particularly advantageous where we employ secondary generating-stations for a large district and where one pair of feeders are to supply current to a number of tertiary converters. The winding of the secondary generators is an extremely small undertaking as compared to the winding of the fine-wire coils of the dynamo-electric machine, and hence if from any cause the insulation of the fine-wire coil of the induction-coil or secondary generator was destroyed the expense of repair would be but a trifle compared with the same amount of destruction in the dynamo-machine. In place of using alternating machines I may use continuous-current machines with provision for reversing or interrupting the current before it passes through the secondary generators.

I do not limit myself to any particular details, as there are many equivalent constructions.

For illustrating several ways of bringing my invention into practice I have shown several drawings, which I will now describe.

In the drawings, Figure 1 is a diagram of one form of my invention in which we have a single secondary generator in series with the primary generator and line, and with the tertiary generators in multiple connection. Fig. 2 is a diagram illustrating two secondary generators in multiple with the primary generator, and also the line-circuit, and with the tertiary generators shown both in multiple and in series with the line-circuit. Fig. 3 is a diagram substantially similar to Fig. 1, with the exception that the primary generator is a continuous-current machine with a circuit-reverser; and Fig. 4 is substantially the same thing with the circuit-interrupter in place of the current-reverser.

A is the primary generator and is wound for low potential and may be either an alternating-current machine or a continuous-current machine.

B is a local circuit preferably having a resistance changer or regulator *b* of any suitable construction and including the coarse wire *c* of a powerful induction-coil or secondary generator C. The fine wire d of the generator C is in circuit with the high-resistance line D, which may, if desired, be provided with a short-circuiting resistance-changer G, forming a shunt connection between the outgoing and return wires of the line.

E are the local or tertiary generators and are simple forms of induction-coils having their fine-wire coils connected to the line D in multiple, and the current passing over said fine-wire coils may be regulated by a resistance-changer e or be cut out by a switch e'.

H are local circuits at various distances along the line, and include the coarse wire of the said tertiary generators E.

I are lamps, motors, or other translating devices in said local circuits H, and h are current-regulators for said local circuits. If desired, a fourth generator J may have its coarse wire included in the distant local circuit H and its fine wire connected to a circuit K, including one or more lamps or other translating devices of higher tension. This would enable both forms of currents to be used at one place or building. The amount of current passing through the tertiary generators E E may also be regulated by a resistance changer or regulator G.

In Fig. 2, in place of a single secondary generator C, we have two sets of generators having their coarse wire coupled in multiple with the primary generator and their fine wire coupled in series with the line D to increase the tension of the current. In this case two of the tertiary generators are shown as arranged in multiple connection with the line, and two (marked E' E') are shown as in series with line. When these two latter are not used, the switch g may be opened.

It is preferable to arrange the local generators in parallel or multiple, as shown. The generators C, E, E', and J are all preferably made with iron cores. They may be made like any good induction apparatus employing primary and secondary coils.

In the construction shown in Fig. 3 we have a continuous-current generator and a current-reverser a in the local circuit B to convert the continuous current into an alternating current before it passes through the secondary generator. Otherwise this figure shows substantially the same system as Fig. 1.

In the case of Fig. 4 we have a current-interrupter a' located in the place of the current-reverser of Fig. 3.

These various systems are simply different methods for putting the same general invention into practice, and hence, in the broad sense, I consider them equivalents.

I am well aware that it may be argued that the double conversion of the current in the manner proposed is objectionable on the ground of loss of energy from that which should theoretically be obtained, but it will be found that the practical advantages to be derived from this system of transmission of electrical energy have far greater merits than the contemporaneous objections. Less care in the handling of the apparatus and less skill on the part of the operator would be required with my improvement, which, aside from the other advantages, is one not to be ignored. It is also evident that while this invention is especially adapted to the employment of high-tension currents in the line it is not so limited.

Having now described my invention, what I claim as new, and desire to secure by Letters Patent, is—

1. In a system for the transmission of electrical energy, the combination of a primary generator having armature and field-magnet coils, a local circuit, a fixed secondary generator having a coil of low resistance in circuit with the primary-generator coils through the local circuit, a line-circuit including the other coil of the secondary generator, a tertiary generator located at a distance from the secondary generator and having its fine-wire coil in circuit with the line, a distant local circuit including the coarse wire of such tertiary generator, and a translating device in said distant local circuit.

2. In a system for the transmission of electrical energy, the combination of a primary generator having armature and field-magnet coils and wound with coarse wire for generating currents of low tension, a local circuit, a secondary generator having its coarse-wire coil in circuit with the coils of the primary generator through the local circuit, a line-circuit of high resistance including the other or fine-wire coil of the secondary generator, a tertiary generator located at a distance from the secondary generator and having its fine-wire coil in circuit with the line, a distant local circuit including the coarse wire of such tertiary generator, and a translating or current-consuming device in said distant local circuit.

3. In a system for the transmission of electrical energy, the combination of a primary generator having armature and field-magnets and wound with coarse wire for generating currents of low tension, a local circuit, a secondary generator having its coarse-wire coil in circuit with the coils of the primary generator through the local circuit, a line-circuit of high resistance including the other or fine-wire coil of the secondary generator, a tertiary generator located at a distance from the secondary generator and having its fine-wire coil in circuit with the line, a distant local circuit including the coarse wire of such tertiary generator, a translating or current-consuming device in said distant local circuit, and a regulator for controlling the current flowing through the primary and secondary generators and local circuit between them.

4. In a system for the transmission of electrical energy, the combination of a primary generator having armature and field-magnets, a local circuit, a secondary generator having a coil of low resistance in circuit with the coils of the primary generator through the local circuit, a line-circuit including the other coil of the secondary generator, a tertiary generator located at a distance from the secondary generator and having its fine-wire coil in circuit with the line, a distant local circuit including the coarse wire of such tertiary generator, a translating or current-consuming device in said local circuit, and a regulator to control the current passing over the line-circuit.

5. In a system for the transmission of electrical energy, the combination of a primary generator having armature and field-magnets and wound with coarse wire for generating currents of low tension, a local circuit, a secondary generator having its coarse-wire coil in circuit with the coils of the primary generator through the local circuit, a line-circuit of high resistance including the other or fine-wire coil of the secondary generator, a tertiary generator located at a distance from the secondary generator and having its fine-wire coil in circuit with the line, a distant local circuit including the coarse wire of such tertiary generator, a translating or current-consuming device in said distant local circuit, a regulator for the current in the line-circuit, and a current-regulator for the current in the local circuit connecting the primary and secondary generators.

6. The combination of a primary generator of electricity having rotating armature and fixed field-magnets, a fixed secondary generator or induction-coil arranged close to said generator for converting low-tension currents into high-tension currents, a short local circuit for conveying the current from the primary generator through the primary coarse-wire coil of the induction-coil, a long line-circuit including the secondary fine-wire coil of the induction-coil, and an induction translating device or current-consuming device in said line-circuit.

7. The combination of a primary generator of electricity having armature and field-magnets wound for currents of low intensity, a secondary generator or induction-coil arranged close to said primary generator, a local circuit of low resistance for conveying the current from the primary generator through the primary or coarse-wire coil of the induction-coil or the secondary generator, a long line-circuit of high resistance including the secondary or fine-wire coil of the induction-coil or secondary generator, and an induction translating device in said long line-circuit.

8. The combination of a primary generator of electricity having armature and field-magnets wound for currents of low intensity, a secondary generator or induction-coil arranged close to said generator, a local circuit of low resistance for conveying the current from the primary generator through the primary or coarse-wire coil of the induction-coil or secondary generator, a long line-circuit of high resistance including the secondary or fine-wire coil of the induction-coil or secondary generator, and means to regulate the current passing through said local circuit.

9. The combination of a primary generator of electricity having armature and field-magnets wound for currents of low intensity, a secondary generator or induction-coil arranged close to said generator, a local circuit of low resistance for conveying the current from the primary generator through the primary or coarse-wire coil of the induction-coil or secondary generator, a long line-circuit of high resistance including the secondary or fine-wire coil of the induction-coil or secondary generator, and a shunt around the line to shunt more or less of the line-current out of the line-circuit.

10. The combination of a generator for currents of electricity of alternately increasing and decreasing potential, a short local circuit therefor, a long line reaching close to the local circuit, and an induction or secondary apparatus connecting said circuits whereby the line receives induced currents of high tension from the current of low tension passing in the local circuit, and an induction translating device for reduction of potential in the line-circuit removed at a distance from the induction or secondary apparatus.

11. The combination of a primary generator of electricity having armature and field-magnets wound for currents of low intensity, a secondary generator or induction-coil arranged close to said generator, a local circuit of low resistance for conveying the current from the primary generator through the primary or coarse-wire coil of the induction-coil or secondary generator, a long line-circuit of high resistance including the secondary or fine-wire coil of the induction-coil or secondary generator, two or more tertiary generators or induction-coils having their fine-wire coils in multiple connection with the line, distant local circuits including the coarse-wire coils of the said tertiary generators, and electric translating or current-consuming devices in said distant local circuits.

12. The combination of a primary generator of electricity having armature and field-magnets wound for currents of low intensity, a secondary generator or induction-coil arranged close to said generator, a local circuit of low resistance for conveying the current from the primary generator through the primary or coarse-wire coil of the induction-coil or secondary generator, a long line-circuit of high resistance including the secondary or fine-wire coil of the induction-coil or secondary generator, two or more tertiary generators or induction-coils having their fine-wire coils in multiple connection with the line, a regulator to control the current flowing through the fine-wire coils of the tertiary generators, distant local circuits including the coarse-wire coils of said tertiary generators and electric translating or current-consuming devices in said distant local circuits.

13. The combination of a generator having armature and field-magnets and wound for currents of low intensity, two or more secondary generators arranged close to the primary generator and having their coarse wire connected to the primary generator in multiple connection, a line-circuit of high resistance including the fine-wire coils of said secondary generators in series, and an induction translating or current-consuming device in said line-circuit at a distance from the secondary generators.

14. The combination of a generator having armature and field-magnets and wound for currents of low intensity, two or more secondary generators arranged close to the primary generator and having their coarse wire connected to the primary generator in multiple connection, a line-circuit of high resistance including the fine-wire coils of said secondary generators in series, and a regulator to vary the current passing through the coarse wire of the secondary generators.

15. A primary source of electric energy having a current of alternately increasing and decreasing potential, a large secondary generator having its low-resistance primary coil in circuit with the source of electrical energy, a line-circuit connecting with the high-resistance secondary coil of the secondary generator, two or more small tertiary generators having their primary coils in multiple connection with the secondary coil of the secondary generator through the line-circuit, and in which the primary coil of the several tertiary generators bear such relation to the secondary coils of the secondary generator as to be properly energized by the current produced in the secondary coils of such secondary generators, and local circuit or circuits including the secondary coils of such tertiary generators.

16. A primary source of electric energy having a current of alternately increasing and decreasing potential, a large secondary generator having its low-resistance primary coil in circuit with such source of energy, a line-circuit connecting with the high-resistance secondary coil of the secondary generator, two or more small tertiary generators having their primary coils in multiple connection with the secondary coil of the secondary generator through the line-circuit, and in which the primary coils of the several tertiary generators bear such relation to the secondary coil of the secondary generator as to be properly energized by the current produced in the secondary coils of said secondary generator, local circuit or circuits including the secondary coils of such tertiary generators, and means to cut out one or more of said tertiary generators from the line.

17. The combination of a generator generating alternating electric currents with transformers for changing the current generated into a current of higher tension, and with mains for conveying this higher-tension current to other transformers at distant stations which reduce the current to a current of lower tension, and with distributing-mains for conveying the reduced current to places where it is to be used.

18. In a system of electrical distribution, the combination of a source of electricity, an induction apparatus or converter for raising the tension of the current from said source, conductors extending from said converter, one or more converters for reducing the tension of the current on said conductors, and translating devices, substantially as set forth.

19. In a system of electrical transmission of energy, the combination of a primary generator for generating current of alternately increasing and decreasing potential and comprising in its construction a field-magnet and armature containing low-resistance coils, a fixed secondary generator having a coil of low resistance in circuit with the primary generator through a local circuit, a line-circuit including a coil of high resistance of the secondary generator, a tertiary generator located at a distance from the secondary generator and having its fine-wire coil in circuit with the line, and a distant local circuit permanently closed when operating and including the coarse-wire coil of the tertiary generator and the translating or current-consuming devices.

20. In a system of electrical transmission of energy, the combination of a primary generator for generating current of alternately increasing and decreasing potential and comprising in its construction a field-magnet and armature containing low-resistance coils, a fixed secondary generator having a coil of low resistance in circuit with the primary generator through a local circuit, a line-circuit including a coil of high resistance of the secondary generator, a tertiary generator located at a distance from the secondary generator and having its fine-wire coil in circuit with the line, a distant local circuit permanently closed when operating and including the coarse-wire coil of the tertiary generator and the translating or current-consuming devices, and a regulator for controlling the current flowing through the primary and secondary generators and local circuit between them.

21. In a system of electrical transmission of energy, the combination of a primary generator for generating current of alternately increasing and decreasing potential and comprising in its construction a field-magnet and armature containing low-resistance coils, a fixed secondary generator having a coil of low resistance in circuit with the primary generator through a local circuit, a line-circuit including a coil of high resistance of the secondary generator, a tertiary generator located at a distance from the secondary generator and having its fine-wire coil in circuit with the line, a distant local circuit permanently closed when operating and including the coarse-wire coil of the tertiary generator and the translating or current-consuming devices, and a regulator to control the current passing through the line-circuit.

22. In a system of electrical transmission of energy, the combination of a primary generator for generating current of alternately increasing and decreasing potential and comprising in its construction a field-magnet and armature containing low-resistance coils, a fixed secondary generator having a coil of low resistance in circuit with the primary generator through a local circuit, a line-circuit including a coil of high resistance of the secondary generator, a tertiary generator located at a distance from the secondary generator and having its fine-wire coil in circuit with the line, a distant local circuit permanently closed when operating and including the coarse-wire coil of the tertiary generator and the translating or current-consuming devices, a regulator to control the current passing through the line-circuit, and a regulator for the current in the local circuit connecting the primary and secondary generators.

23. In a system of electrical transmission of energy, the combination of a primary generator for generating current of alternately increasing and decreasing potential and comprising in its construction a field-magnet and armature containing low-resistance coils, a fixed secondary generator having a coil of low resistance in circuit with the primary generator through a local circuit, a line-circuit including a coil of high resistance of the secondary generator, a tertiary generator located at a distance from the secondary generator and having its fine-wire coil in circuit with the line, a distant local circuit permanently closed when operating and including the coarse-wire coil of the tertiary generator and the translating or current-consuming devices, and means to regulate the current passing through the distant local circuit.

24. In a system of electrical transmission of energy, the combination of a primary generator for generating current of alternately increasing and decreasing potential and comprising in its construction a field-magnet and armature containing low-resistance coils, a fixed secondary generator having a coil of low resistance in circuit with the primary generator through a local circuit, a line-circuit including a coil of high resistance of the secondary generator, a tertiary generator located at a distance from the secondary generator and having its fine-wire coil in circuit with the line, a distant local circuit permanently closed when operating and including the coarse-wire coil of the tertiary generator and the translating or current-consuming devices, and a shunt-circuit around the line to shunt more or less of the line-current out of the line-circuit.

25. The combination of a primary generator of electricity having armature and field-magnets wound for currents of low intensity, a secondary generator or induction-coil arranged close to said generator, a local circuit of low resistance for conveying the current from the primary generator through the coarse-wire coil of the induction-coil or secondary generator, a long line-circuit including the fine-wire or secondary coil of the secondary generator, two or more tertiary generators or induction-coils having their fine-wire coils in multiple connection with the line, distant local circuits permanently closed when operating for each of the tertiary generators, and electric translating or current-consuming devices in said distant local circuits.

26. The combination of a primary generator of electricity having armature and field-magnets wound for currents of low intensity, a secondary generator or induction-coil arranged close to said generator, a local circuit of low resistance for conveying the current from the primary generator through the coarse-wire coil of the induction-coil or secondary generator, a long line-circuit including the fine-wire or secondary coil of the secondary generator, two or more tertiary generators or induction-coils having their fine-wire coils in multiple connection with the line, distant local circuits permanently closed when operating for each of the tertiary generators, electric translating or current-consuming devices in said distant local circuits, and a regulator to control the current flowing through the fine-wire coils of the tertiary generator.

27. The combination of a generator having armature and field-magnets, two or more secondary generators arranged close to the primary generator, a local circuit connecting the coarse-wire coils of the secondary generators in parallel with the primary generator, a line-circuit including the fine-wire coils of the secondary generators in series, a tertiary generator having its fine-wire coil connected with the line, and a distant local circuit containing a current-consuming or translating devices receiving current from the coarse-wire coil of said tertiary generator and permanently closed when operating.

In testimony of which invention I have hereunto set my hand.

R. M. HUNTER.

Witnesses:
ERNEST HOWARD HUNTER,
KING B. HUNTER.